Oct. 3, 1950 F. S. SINCLAIRE 2,524,546
ROLLING ELEMENT FOR GAMES AND THE LIKE
Filed Aug. 3, 1948

INVENTOR.
FRANCIS S. SINCLAIRE
BY
*Kenyon & Kenyon*
ATTORNEYS

Patented Oct. 3, 1950

2,524,546

UNITED STATES PATENT OFFICE 2,524,546

ROLLING ELEMENT FOR GAMES AND THE LIKE

Francis S. Sinclaire, Brooklyn, N. Y.

Application August 3, 1948, Serial No. 42,281

14 Claims. (Cl. 273—128)

My invention relates to an improvement in the construction of a rolling element for games and the like and more particularly to such a rolling element having different gravitational and magnetic centers.

The primary object of my invention is to provide a new and improved rolling element for games and the like which has different gravitational and magnetic centers.

Another object of my invention is to provide such a rolling element which will follow an erratic path of motion under the influence of the force of gravity.

Still another object of my invention is to provide such a rolling element whose erratic path of motion due to the force of gravity can also be influenced by a magnetic field adjacent the path of the element.

Other and further objects of my invention will be apparent from the following description when taken with the accompanying drawings, in which.

Figure 1:
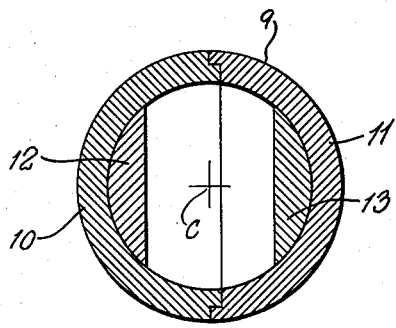
Fig. 1 shows a cross-sectional view of the preferred form of my invention wherein the rolling element is in the form of a spherical ball.

Referring now to the drawings in detail, in Fig. 1 is shown a cross-sectional view of a rolling element in the form of a ball 9 according to my invention. This ball is hollow and comprises two interfitting halves 10 and 11. As shown, each half is in the form of a demi-sphere. Thus, when fitted together they form a preferably spherical body. To the inner surface of half 10 is secured a segment 12 of magnetizable material, preferably soft iron. To the inner surface of half 11, and preferably diametrically opposite segment 12, is secured a similarly shaped segment 13. Segment 13, however, is of non-magnetizable material and of a weight per unit volume greater than that of segment 12. Preferably segment 13 is made of lead. In use ball 9 is rolled on a horizontal or slightly inclined planar surface beneath which are strategically positioned one or more electromagnets. Due to the gravitational pull upon the off-center segment 13, ball 9 will describe an erratic path of motion when rolled along the planar surface. Whenever the ball 9 comes within the field of one of the electromagnets, it will be attracted toward that magnet due to the presence of segment 12 of magnetizable material. Thus, the path of motion of the ball is made even more erratic. For this reason, I have given this form of my invention the name "Screwball."

Many forms of games which may be played with the "Screwball" will immediately suggest themselves. Thus, if the ball 9 is placed on a level planar game surface with electro-magnets positioned thereunder such that the ball 9 is never without the field of at least one magnet and the electro-magnets connected together so that they may be energized simultaneously, the ball 9 may be made to move initially by momentarily energizing the magnets. If the magnets were not thereafter re-energized, the "Screwball" would, of course, eventually come to rest somewhere on the planar game surface, after its momentum had been dissipated, with the segment 13 in its downmost position. However, as pointed out above, subsequent momentary energization of the electro-magnets will then cause segment 12 to be attracted towards the nearest magnet and the "Screwball" will then again begin its erratic path of motion on the game board. Periodic energization of the magnets thus controls, to some extent, the motion of the "Screwball."

When a plurality of electro-magnets are used, these may be connected in two or more groups, each group being energized through a separate control circuit. Thus, games can be designed for any number of players, each player having control of a single group of electro-magnets.

Another modification might entail the use of a suitable timing switch which would pass control of the electro-magnets from one player to another after a predetermined period of time. This would prevent one player from gaining an unfair playing advantage by energizing his control circuit continuously.

Alternatively, the motion of the "Screwball" may be controlled by moving a permanent magnet around under the game board surface. For example, this permanent magnet might be secured to the end of a wooden rod or be in the form of a magnetic wand.

Halves 10 and 11 of the ball 9 are preferably also made of magnetizable material in order to reduce the necessary strength of the magnets. However, they may be made of a non-magnetizable material, such as plastic or composition, if desired, the strength of the game magnets then being correspondingly increased or the magnets more closely spaced.

It is obvious, of course, that the radius of the ball 9, the size of the segment 12, and the weight of the segment 13 can be varied in any desired fashion to produce a suitable rolling element for a game.

Figure 2:
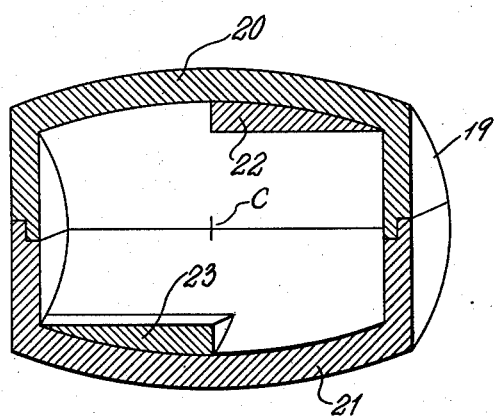
Fig. 2 is a perspective view longitudinally cut to expose the interior of a modification of my invention wherein the rolling element is barrel shaped.

In Fig. 2 is shown a perspective view longitudinally cut to expose the interior of a modification according to my invention. The rolling element here is in the form of a barrel-shaped body 19 and again preferably is composed of two interfitting halves 20 and 21. Secured to the inner surface of half 20 is a segment of magnetizable material 22 and segment 23, corresponding to segment 13 of Fig. 1, is secured to the inner surface of half 21. As shown, segments 22 and 23 preferably each extend only over one-half of the width of their respective halves and are positioned in diametrically opposed quadrants so that the barrel-shaped body 19 will have an erratic path of motion when utilized in a game.

Figure 3:
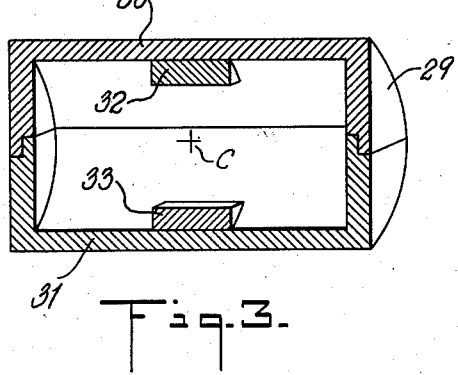
Fig. 3 is a view similar to that of Fig. 2 of another embodiment of my invention wherein the rolling element is cylindrically shaped.

In Fig. 3 is shown a view similar to that of Fig. 2 of a further modification according to my invention comprising a cylindrical body 29, again composed of interfitting halves 30 and 31. To the inner surface of half 30 is affixed a segment of magnetizable material 32 and a segment 33, corresponding to segments 13 of Fig. 1 and 23 of Fig. 2, is secured to the inner surface of half 31. Segments 32 and 33 are shown symmetrically positioned about the vertical axis and are preferably positioned diametrically opposite one another relative to the horizontal or longitudinal axis of the body 29.

Figure 4:
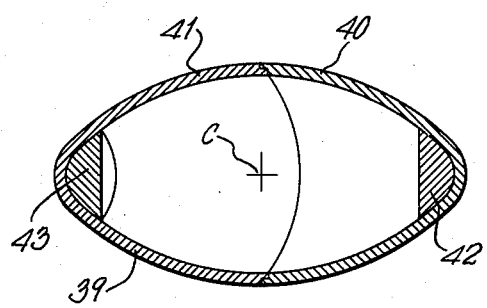
Fig. 4 is a view similar to that of Figs 2 and 3 of still another embodiment of my invention wherein the rolling element is in the shape of a football.

In Fig. 4 is shown a view similar to that of Figs. 2 and 3 of still a further modification according to my invention comprising a body 39 having an ovoid shape similar to that of a football and again composed of interfitting halves 40 and 41. To the inner surface of half 40 and preferably adjacent the apex thereof is affixed a segment of magnetizable material 42. A segment 43, corresponding to segments 13, 23, and 33 of Figs. 1, 2, and 3, respectively, is similarly secured to the inner surface of half 41. By symmetrically positioning segments 42 and 43 as shown the erratic path of motion of the body 39 is further accentuated.

It will be apparent from an inspection of the above four figures that in each case segments 12, 22, 32, and 42 lie on opposite sides of the center C of the bodies 9, 19, 29, and 39 from the respective segments 13, 23, 33, and 43. The center C is the geometric center of each configuration and, assuming that the halves of each of bodies 9, 19, 29, and 39 are made of homogeneous and uniform material, would also be the normal center of gravity of these bodies in the absence of segments 12, 13, 22, 23, 32, 33, 42, and 43.

Figure 5:
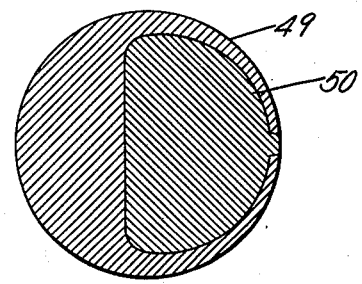
Fig. 5 shows a cross-sectional view of another embodiment of my invention wherein the rolling element is in the form of a spherical ball having an enlarged cavity filled with heavy non-magnetizable material.
Figure 6:
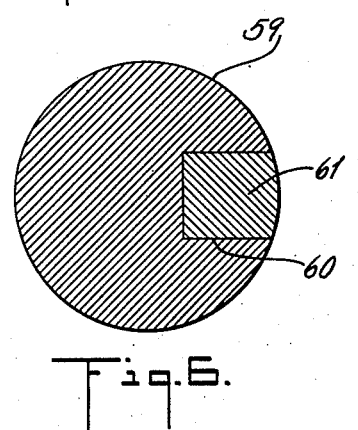
Fig. 6 shows a cross-sectional view of another embodiment of my invention similar to that of Fig. 5, but having an aperture rather than an enlarged cavity.

In Figs. 5 and 6 are shown cross-sectional views of rolling elements in the form of balls 49 and 59, respectively, according to my invention. Balls 49 and 59 are preferably made substantially in one piece of some suitable magnetizable material, such as iron. As shown in Fig. 5 an enlarged cavity 50 is formed with a small opening therefor at the surface of the ball 49. This cavity is then filled with some heavy non-magnetizable material, such as molten lead. As shown in Fig. 6 ball 59 differs from ball 49 in that instead of the enlarged cavity 50, a hole or aperture 60 is drilled in one side of the ball 59 and this filled with a plug 61 of some suitable heavy non-magnetizable material, such as lead.

It will be realized that my invention may be applied to other purposes besides games and toys, such as for the exhibition and utilization of magnetic phenomenon in combination with gravitational phenomenon. It may also be applied to advertising purposes and displays.

Numerous additional applications of the above-disclosed principles will occur to those skilled in the art and no attempt has here been made to exhaust such possibilities. The scope of my invention is defined in the following claims.

What I claim is:

1. A rolling element for games and the like comprising a body rollable on a horizontal surface and including a magnetic material and having different gravitational and magnetic centers disposed on opposite sides of the geometric center of said body.

2. A rolling element for games and the like comprising a body rollable on a horizontal surface and having its center of gravity displaced from the geometric or normal center of gravity for the configuration of said body and a segment of magnetizable material positioned within said body on the other side of said normal center of gravity from the existing center of gravity.

3. A rolling element according to claim 2 wherein said body has a substantially spherical surface.

4. A rolling element according to claim 2 wherein said body is in the shape of a cylinder.

5. A rolling element according to claim 2 wherein said body is in the shape of a barrel.

6. A rolling element according to claim 2 wherein said body is in the shape of an ovoid.

7. A rolling element for games and the like comprising a hollow body composed of two halves adapted to be joined together, a segment of magnetizable material secured on the inner surface of one half and a segment of non-magnetizable material whose weight is greater than that of said magnetizable segment secured on the inner surface of the other half, whereby the center of gravity of said element is displaced from the geometric center and said body has different gravitational and magnetic centers.

8. Apparatus according to claim 7 wherein said segments are positioned substantially diametrically opposite one another.

9. Apparatus according to claim 7 wherein said body is also formed of magnetizable material.

10. A rolling element for games and the like comprising a body of magnetizable material rollable on a horizontal surface and having an off-center cavity and non-magnetizable material in said cavity whose weight per unit volume is greater than that of said magnetizable material.

11. A rolling element according to claim 10 wherein said body has a substantially spherical surface.

12. A rolling element for games and the like comprising a body of magnetizable material rollable on a horizontal surface and having an off-center aperture and a plug of non-magnetizable material in said aperture whose weight per unit volume is greater than that of said magnetizable material.

13. A rolling element for games and the like comprising a body of magnetizable material rollable on a horizontal surface and having its center of gravity displaced from the geometric or normal center of gravity for the configuration of said body and its magnetic center on the other side of said normal center of gravity from the existing center of gravity.

14. A rollable element for games and the like comprising a body of magnetizable material of substantially circular cross section along one axis thereof so as to be rollable on a horizontal surface and having its center of gravity displaced from the geometric or normal center of gravity for the configuration of said body and its magnetic center on the other side of said normal center of gravity from the existing center of gravity.

FRANCIS S. SINCLAIRE.

REFERENCES CITED

The following references are of record in the file of this patent:

UNITED STATES PATENTS

| Number | Name | Date |
|---|---|---|
| 996,458 | Coleman | June 27, 1911 |
| 1,299,092 | Abrahmson | Apr. 1, 1919 |
| 2,277,057 | Bach | Mar. 24, 1942 |